(12) United States Patent
Hwang (10) Patent No.: US 6,974,114 B2
(45) Date of Patent: Dec. 13, 2005

(54) DOUBLE VALVE FLUSHER

(75) Inventor: Su Hwang, Nan-Tou (TW)

(73) Assignee: Hydrotek Corporation, Nan-tou (TW)

( * ) Notice: Subject to any disclaimer, the term of this patent is extended or adjusted under 35 U.S.C. 154(b) by 0 days.

(21) Appl. No.: 10/838,208

(22) Filed: May 5, 2004

(65) Prior Publication Data

US 2005/0247899 A1    Nov. 10, 2005

(51) Int. Cl.[7] .............................................. F16K 31/12
(52) U.S. Cl. ..................... 251/26; 251/30.01; 251/31
(58) Field of Search ............................... 251/26, 30.01, 251/30.02, 30.03, 30.04, 30.05, 25, 31

(56) References Cited

U.S. PATENT DOCUMENTS

| | | | | |
|---|---|---|---|---|
| 3,008,682 A | * | 11/1961 | Filliung et al. | ................ 251/26 |
| 3,905,575 A | * | 9/1975 | Zeuner et al. | ............ 251/30.02 |
| 4,201,362 A | * | 5/1980 | Nishimi et al. | .......... 251/30.05 |
| 6,253,784 B1 | * | 7/2001 | Simoens | ................... 251/30.01 |
| 6,659,420 B2 | * | 12/2003 | Hwang et al. | ................. 251/26 |

* cited by examiner

*Primary Examiner*—John Bastianelli
(74) *Attorney, Agent, or Firm*—Bacon & Thomas PLLC (57) ABSTRACT

A double valve flusher includes a body, a separating plate, an upper and a lower valve base, a movable valve, a film valve, a fixing member, and an electromagnet. An upper leak room is formed between the film valve and the upper valve base. A leak room is formed between the separating plate, the lower valve base and the movable valve contained in a chamber in the body. The upper leak passageway in the upper leak room and the upper valve base is blocked or opened by the core of the electromagnet, thus controlling the film valve in disfiguring to block or open the leak passageway of the leak room and the lower valve base. Then the movable valve is controlled to move up and down to flush or stop flushing water into a urinal where this flusher is positioned.

4 Claims, 7 Drawing Sheets

DOUBLE VALVE FLUSHER

BACKGROUND OF THE INVENTION

1. Field of the Invention

This invention relates to a flusher, particularly to one having a double valve consisting of a movable valve and a film valve, applicable to low electric energy or high water pressure condition, and subsequently saving electricity and also increasing momentary water volume to be flushed out, strengthening water force to get better cleaning effect for a urinal or the like.

2. Description of the Prior Art

A conventional flusher disclosed in a Taiwan Patent application of No. 82215238 includes a body, a movable valve, a fixing member, a power supplier, and an electromagnet combined together.

The body has a chamber, an inlet formed at a side for connecting an inlet tube, an outlet formed in a lower end for connecting an outlet tube, a separating plate sealing an upper side of the body, a post provided to pass through the center of the separating plate, and a housing covered on the upper side.

The movable valve is deposited in the chamber of the body, controlling a passageway between the inlet and the outlet.

The fixing member is fixed on the separating plate of the body, covered by the housing.

The power supplier is fixed in the interior of the housing, connected with electronic eyes fixed on the housing, and turning on and off the power supplier.

The electromagnet is fixed on the fixing member, receiving power from the power supplier, and its core is normally positioned to block a leak passageway in the upper end of the post so the upper portion of the movable valve cannot communicate with the leak chamber for exhausting water to leak pressure. But when the electromagnet is powered to generate magnetism, the core is moved up so the stored water in the leak chamber can flow out through the leak passageway and the center hole of the movable valve to leak pressure. Therefore, the movable valve is moved up by means of the water pressure difference caused in the upper and the lower portion, letting the inlet communicate with the outlet to flush water out into a urinal or the like.

SUMMARY OF THE INVENTION

The conventional flusher described above is designed to have a single valve, found to have the following disadvantages.

1. The core directly blocks the leak passageway on the separating plate, requiring a comparative large power for the electromagnet, consuming much electric energy. So the number of the coils of the electromagnet should be comparatively numerous so the size of the electromagnet becomes substantially large to need comparatively large power. Therefore, the electromagnet may not easily generate magnetism and lose its function, should the power supplier have rather weak voltage.

2. As the water pressure in the leak passageway is high, especially in case of a high water pressure, the electromagnet cannot often block the leak passageway unless the excessive high water pressure is improved, worsening the function of flushing.

3. As the core of the electromagnet directly controls the opening and closing of the upper end of the leak passageway in the central section of the separating plate, the diameter of the leak hole cannot be made quite large. Then in water exhausting to leak pressure, leak pressure cannot be performed quickly, limited by the small diameter of the leak passageway, and subsequently, the movable valve may open too slowly, causing momentary flushing water volume insufficient, and water force also insufficient to affect cleaning effect.

So this invention has been devised to offer a double valve flusher, which includes a body, a separating plate fixed on the body, an upper valve base and a lower valve base fixed on the center of the separating plate, a film valve located in an upper room (i.e. chamber) formed between the upper and the lower valve base, power and high water pressure, aside from having fixing member fixed on the upper valve base for fixing an electromagnet thereon. Then an upper leak room is formed between the film valve and the lower surface of the upper valve base, and a leak room is formed between the separating plate, the lower valve base and the chamber in the body. At the same time, the upper leak passageway of the upper leak room and the upper valve base can be blocked or opened by the core of the electromagnet so as to control flexible disfiguring of the film valve. The leak room and the lower valve base has the leak passageway blocked or opened by the disfiguring of the film valve, controlling the movement of a movable valve in flushing water.

The double valve flusher can be used with low power and high water pressure, aside from having function of momentarily flushing comparatively large water volume.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
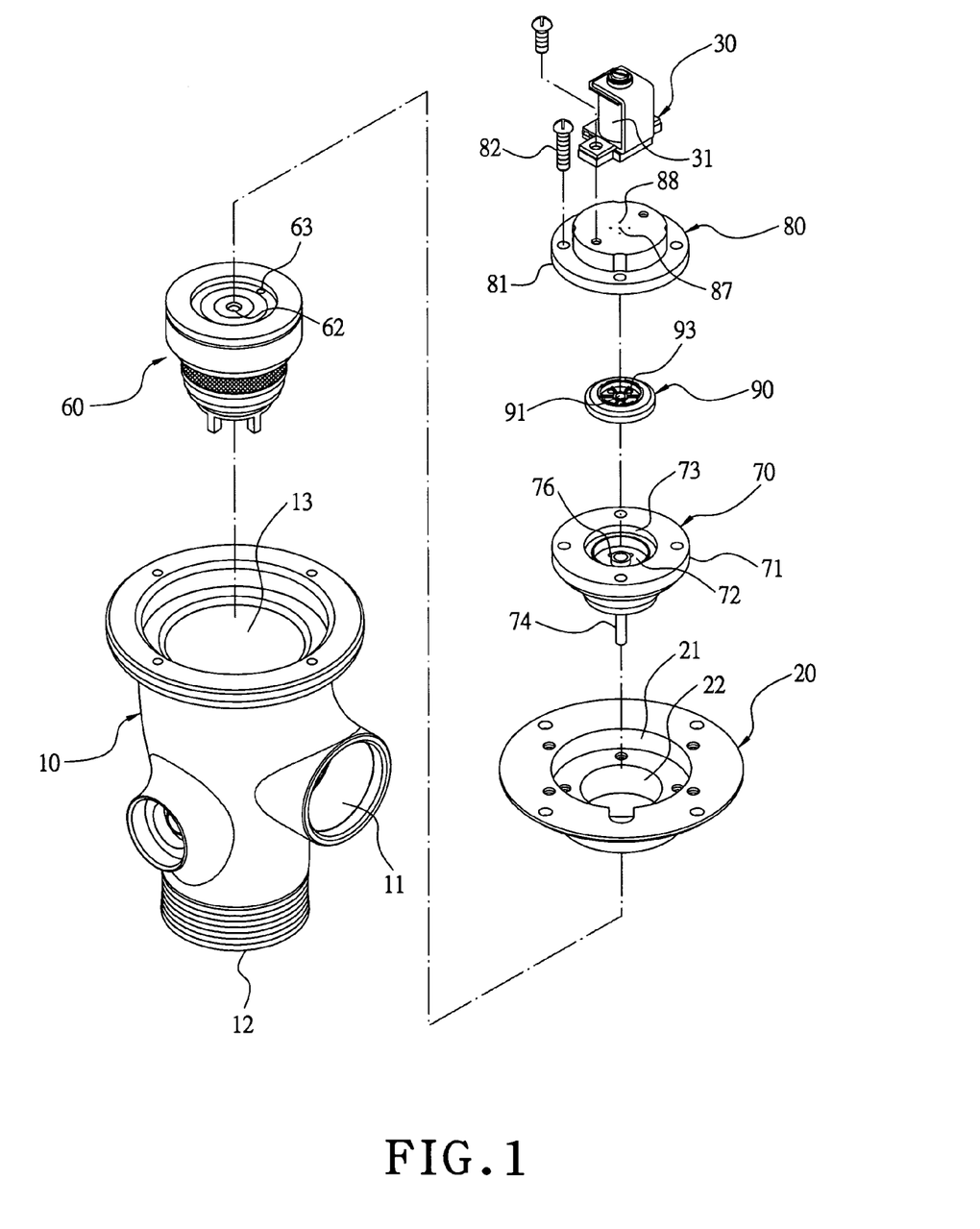
FIG. 1 is a partial exploded perspective view of a double valve flusher in the present invention.
Figure 2:
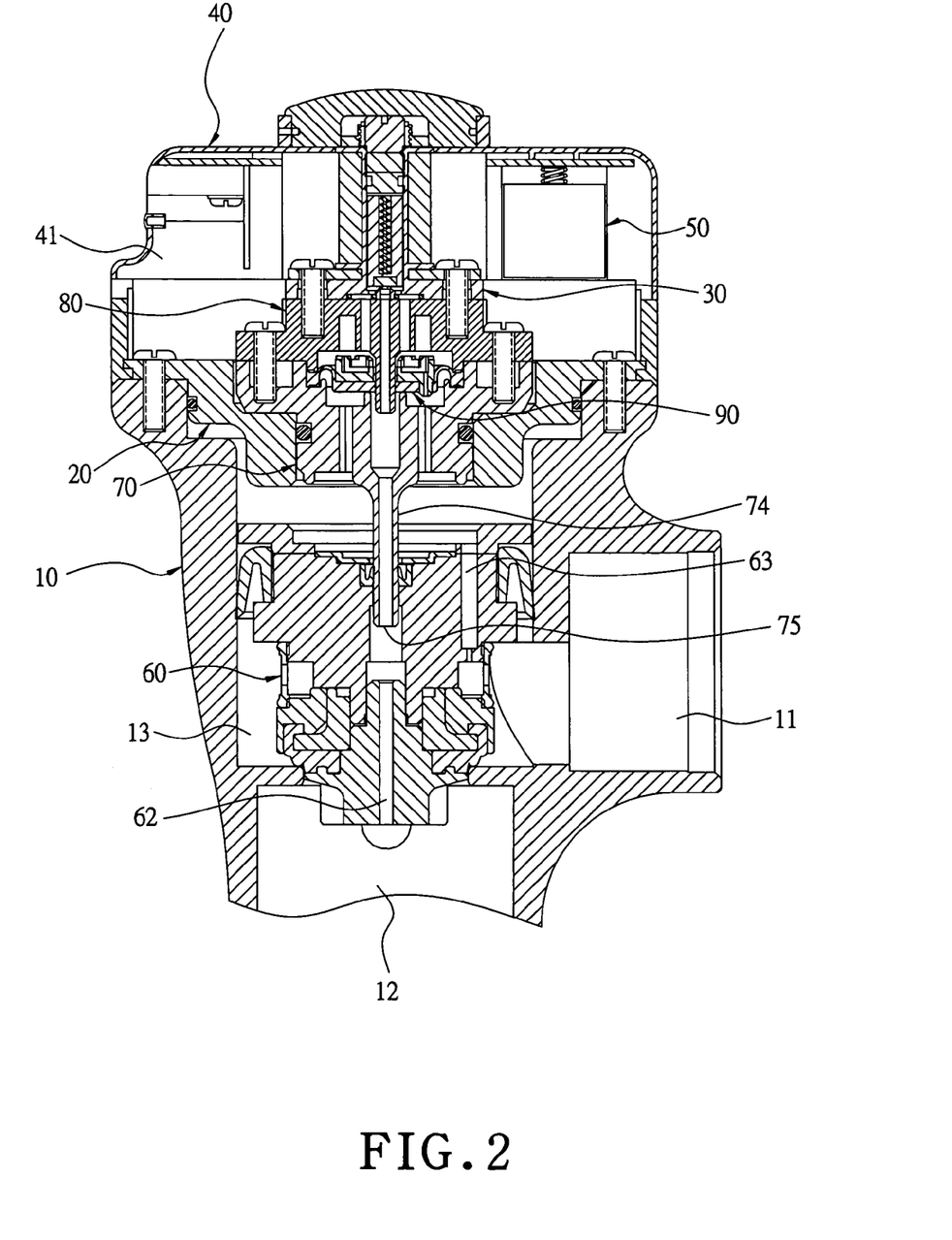
FIG. 2 is a cross-sectional view of the double valve flusher in the present invention.

A preferred embodiment of a double valve flusher in the present invention, as shown in FIGS. 1 and 2, includes a body 10, a separating plate 20, a fixing member 30, a housing 40, a power supplier 50, a movable valve 60, a lower valve base 70, an upper valve base 80, and a film valve 90 as main components combined together.

The body 10 is provided with an inlet 11 at one side for connecting a water tube, an outlet 12 at a lower end for connecting a water tube, and a chamber 13 in its interior.

The separating plate 20 is fixed on an upper side of the body 10, having a center position recess 21, a center hole 22 in the center position recess 21.

The fixing member 30 is located on the upper end of the separating plate 20, and an electromagnet 31 is fixed on the fixing member 30.

The housing 40 covers the upper side of the body 10, sealing the fixing member 30 and the electromagnet 31 therein and having two electronic eyes 41 fixed firmly on its outer surface.

The power supplier 50 is fixed inside the housing 40, connected electrically with the two electronic eyes 41, which control turning on and off of the power supplier 50 in supplying electric power to the electromagnet 31.

The movable valve 60 is placed in the chamber 13 of the body 10, having a leak room 61 in the upper portion, a lengthwise center hole 62 communicating with the outlet 12, a side hole 63 at one side of the center hole 62 communicating with the inlet 11. The movable valve 60 is controlled by the electromagnet 31 to move up and down in the chamber 13 to partition or connect the inlet 11 and the outlet 12 for opening or closing the water passageway.

Figure 3:
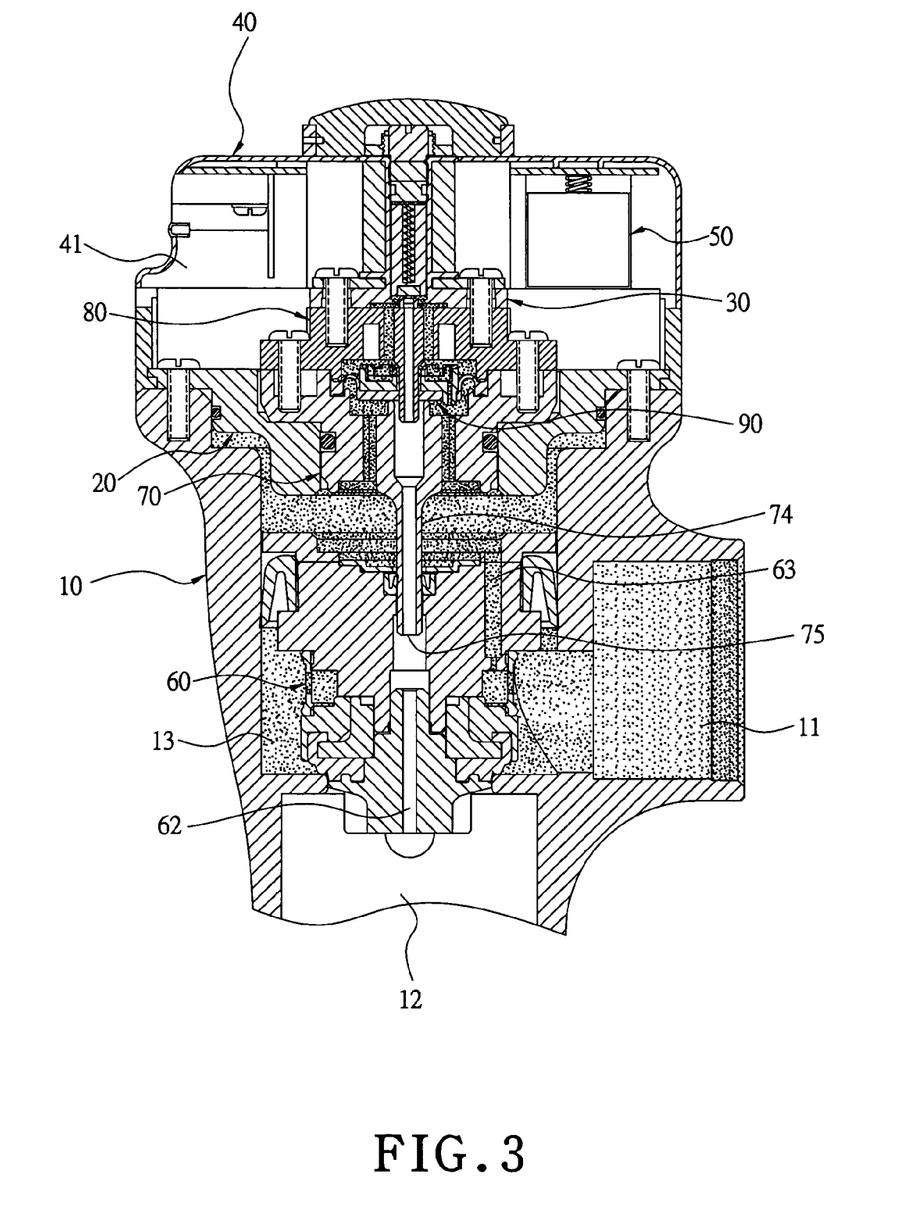
FIG. 3 is a cross-sectional view of the double valve flusher in a closed condition in the present invention.

Next, the main improvement according to the present invention, referring to FIG. 3, is to be described below.

The separating plate 20 has the position recess 21 and the center hole 22.

The lower valve base 70 has a circumferential position edge 71 of a comparatively large diameter formed in an upper end, fitting in the position recess 21 of the separating plate 20, having its lower section sealed in the center hole 22. The lower valve base 70 further has a valve recess 72 in an upper surface, an annular position groove 73 formed in an annular wall defining the valve recess 72, a post extending downward from the lower surface, a lengthwise leak passageway 75 formed in the valve recess 72 and the post 74, and four lengthwise leak holes 76 formed spaced apart around the post 74. The post 74 extends limitedly in the upper section of the center hole 62 of he movable valve 60.

The upper valve base 80 has a circumferential position edge 81 to be located just on the circumferential position edge 71 of the lower valve base 70 so the lower and the upper valve base 70 and 80 are tightly combined together by means of bolts 82. Further, the upper valve base 80 has a valve recess 83 formed in a lower surface to form an upper room 84 together with the valve recess 72 of the lower valve base 70, an annular projection 85 extending from the wall defining the valve recess 83, and a second post 86 extending down from the lower end to fit in the upper section of the leak passageway 75 of he lower valve base 70 and having a lengthwise upper leak way 87 and four lengthwise upper leak holes 88 formed spaced apart around the second post 86.

The film valve 90 is located in the annular position groove 73 of the lower valve base 70 and contacts with the annular projection 85 of the upper valve base 80, and also is firmly contained in the upper room 84 formed by the lower and the upper valve base 70 and 80. The film valve 90 further has a posthole 91 in the center for the second post 86 to pass through so that an upper leak room 92 may be formed between the upper surface of the film valve 90 and the lower surface of the upper valve base 80. Then the film valve 90 may deform elastically owing to the water pressure in the upper leak room 92, and close up the upper opening of the leak passageway 75 of the lower valve base 70. The film valve 90 further has leak holes 93 around the posthole 91 to communicate with the upper leak room 92 and the leak hole 76 of the lower valve base 70.

The fixing member 30 has an upper center upper passageway 32 formed in a lower wall and normally closed up by the core 33 of the electromagnet 31, and plural upper lengthwise flow passageways 34 spaced apart around the upper center passageway 32. Thus the upper flow passageways 34 communicate with the upper center passageway 32 when the core 33 of the electromagnet 31 is moved up by magnetism activated by power. In addition, the fixing member 30 has an annular position groove 35 in the lower surface around the upper center passageway 32 for the upper flow passageways 34 to be located therein, and an anti-leak gasket 36 is respectively fitted at the inner and the outer side of the wall defining the annular position groove 35 so as to prevent water leak from the contact surface of the upper and the lower valve base 80 and 70.

Figure 4:
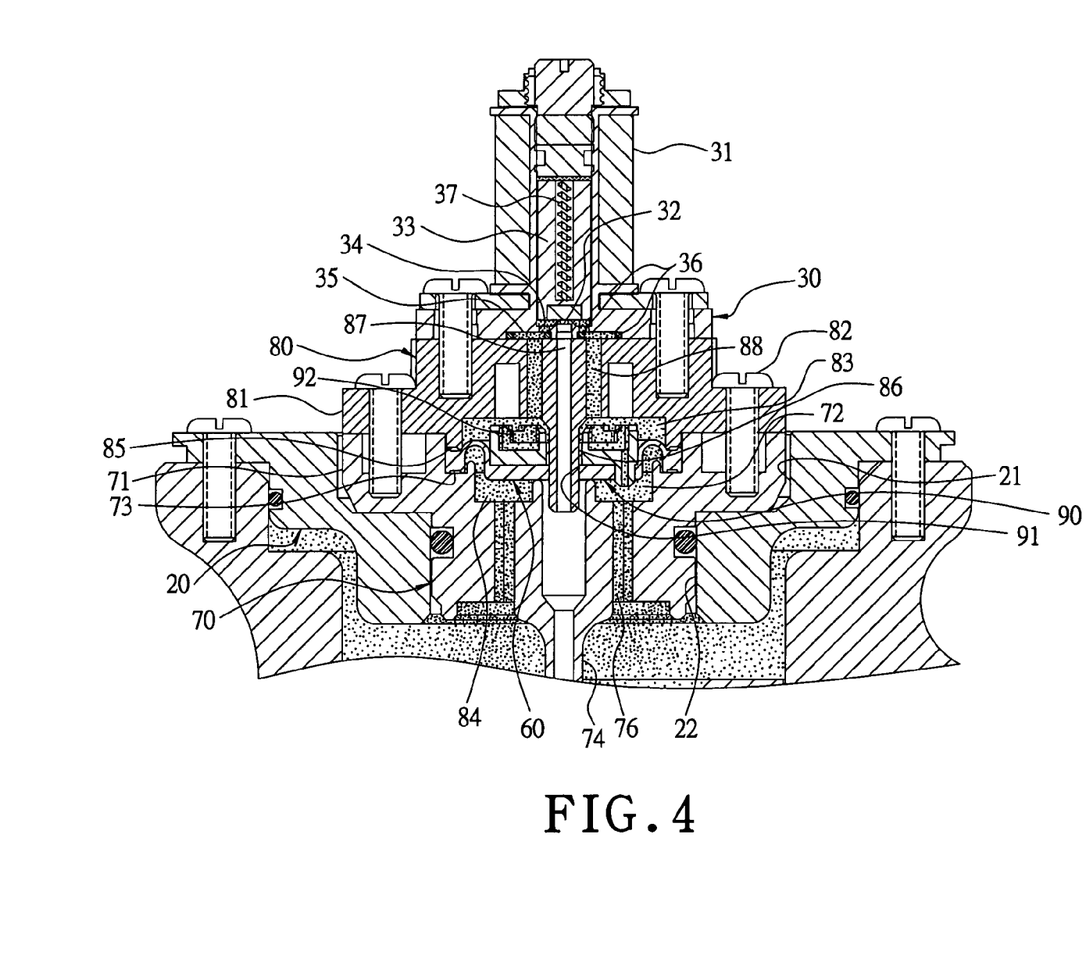
FIG. 4 is a partial cross-sectional view of the double valve flusher in the closed condition in the present invention.
Figure 5:
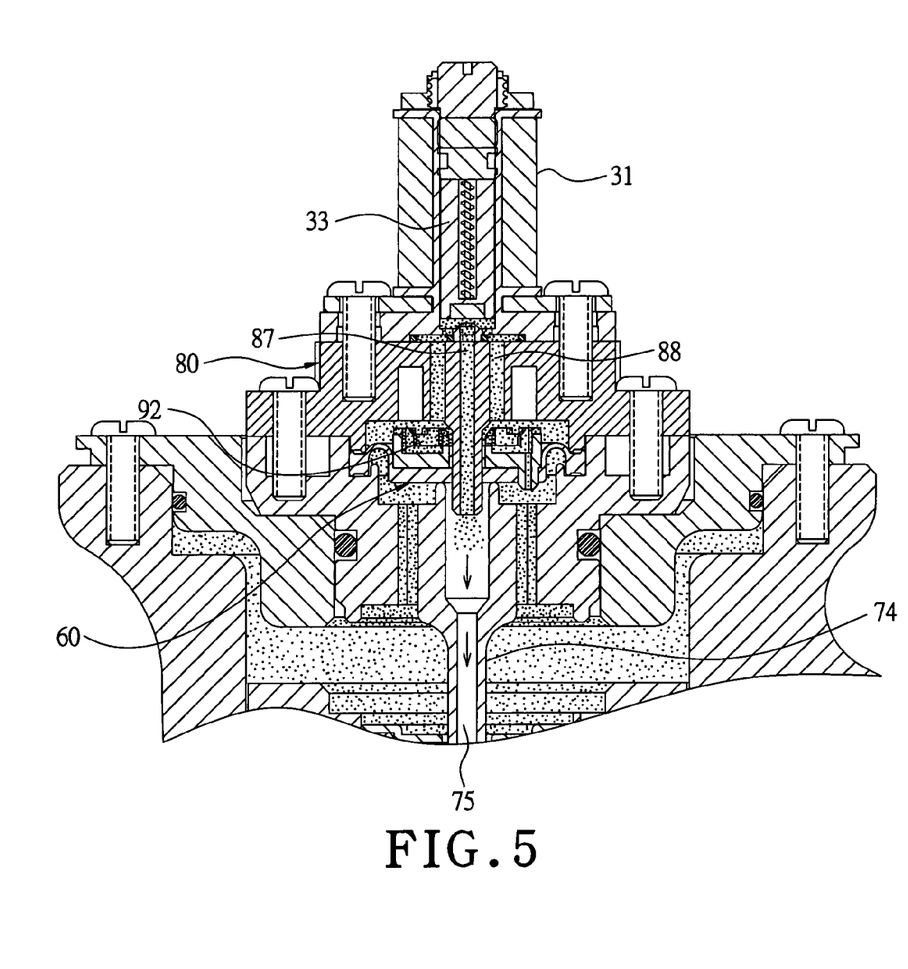
FIG. 5 is a cross-sectional view of an electromagnet moving up to open the double valve flusher in the present invention.
Figure 6:
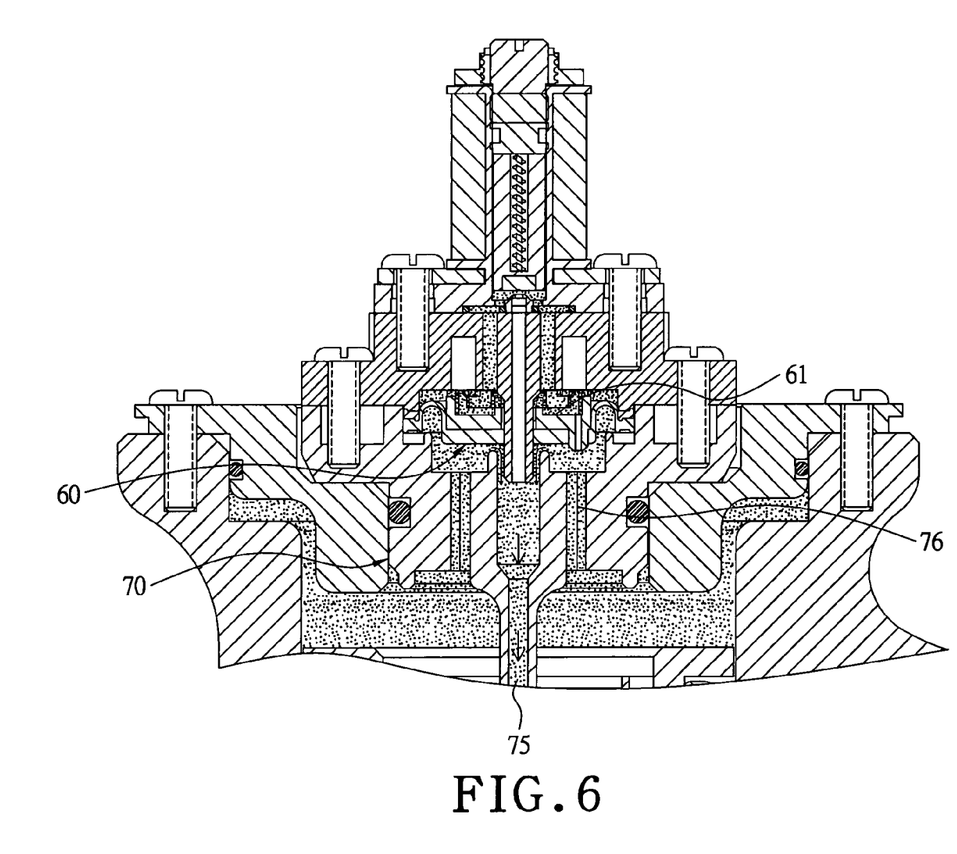
FIG. 6 is a cross-sectional view of a film valve deformed upward flexibly to open the double valve flusher in the present invention; and, FIG. 7 is a cross-sectional view of the movable valve moved up to open for flushing water in the present invention.
Figure 7:
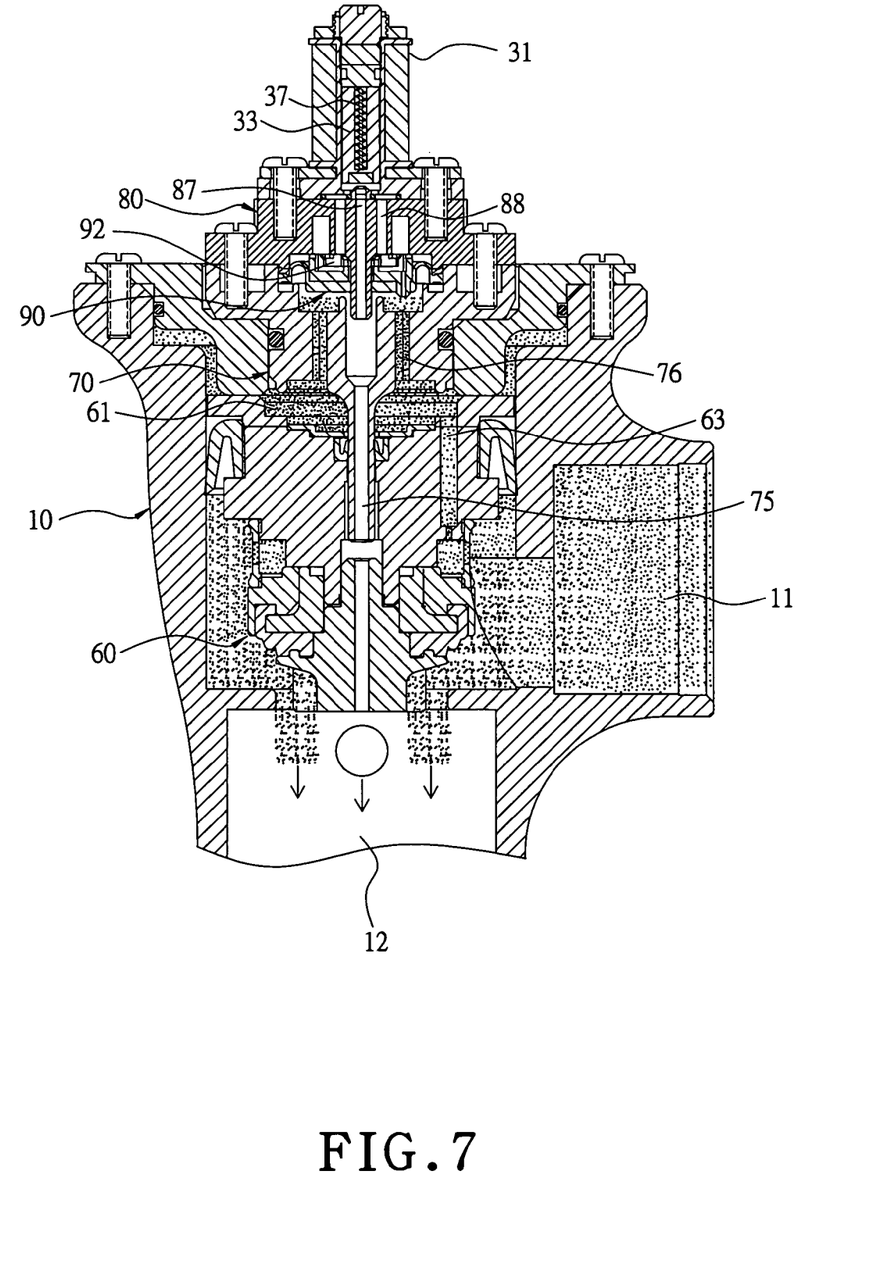

Next, how to use this flusher is to be described. Referring to FIGS. 4 and 5, when a person comes near to any of the two electronic eyes 41 on the housing 40, the electronic eye 41 generates a signal to let the power supplier 50 supply the electromagnet 31 with electricity to activate it generate magnetism to shift the core 33 upward, connecting the upper leak hole 88 of the upper valve base 80 with the upper leak passageway 87 so that the water in the upper leak room 92 may flow through the upper leak hole 88 and the upper leak passageway 87 into the leak passageway 75 of the first post 74 and then into the center hole 62 of the movable valve 60. Then the leak room 92 on the film valve 90 releases its pressure. At this time, the film valve 90 may disfigure because of the pressure discrepancy of the upper and the lower side of the film valve 90, warping up flexibly, permitting the leak hole 76 to communicate with the center leak passageway 75, as shown in FIG. 6. Then the water in the upper leak room 61 on the movable valve 60 may flow through the leak hole 76 into the center hole 62 and subsequently through the outlet 12 so that the pressure in the leak room 61 may be released. At this time, the movable valve 60 moves up owing to the water pressure discrepancy of its upper and its lower side, as shown in FIG. 7, and the movable valve 60 has its lower end leaving the upper opening of the outlet 12, letting water flow instantly through the inlet 11 and then through the outlet 12 to be flushed out.

On the contrary, when a person goes far from the electronic eyes 41, the eyes 41 may generate a signal to let the power supplier cut off its power to the electromagnet 31, which then no longer generates magnetism, letting the core 33 fall down from the elevated position by means of the elasticity of the coil spring 37. Then the passageway between the center leak holes 88 and the center leak passageway 87 is blocked, with the upper leak room 92 filled with water once again, and with the film valve 90 subsequently recovering its original shape, blocking the passageway between the leak hole 76 and the center leak passageway 76, letting water flowing through the inlet 11 and then into the leak room 61 via the side hole 63 and forcing the movable valve 60 to move down to block the upper opening of the outlet 12, stopping flushing.

The invention has the following advantages, as can be seen from the foresaid description.

1. The electromagnet 31 does not need too large power to let the core 33 block the water flowing passageway to consume only small electricity because of its double valve design, and the coil number of the core can be reduced, and so is its size so that the electromagnet may function as usual, even if the power supplier should supply weak electricity.

2. The core 33 can function to have enough force for blocking the water passageway as the electromagnet needs only comparatively small power, and this flusher can be used even for a high water pressure.

3. The leak passageway 75 of the lower valve base 70 can be made to have a larger diameter than the conventional one, improving the drawback of the small-diameter leak passageway in the separating plate of the single valve of the conventional one. So the leaking speed is upgraded a large extent in case the leak room 61 releases pressure through the leak holes 76 into the center leak passageway 75. In other words, the movable valve 60 can open more quickly than in the conventional flusher, so water can flow through the inlet 11 and then through the outlet 12 instantly and with large volume and large force, greatly elevating flushing effect.

While the preferred embodiment of the invention has been described above, it will be recognized and understood that various modifications may be made therein and the appended claims are intended to cover all such modifications that may fall within the spirit and scope of the invention

What is claimed is:

1. A double valve flusher comprising:

a body provided with an inlet in one side, an outlet in a lower end, said inlet and said outlet respectively connected with a water tube, and a chamber formed in the interior of said body;

a separating plate fixed on an upper side of said body;

a fixing member located on an upper end of said separating plate, and an electromagnet fixed on said fixing member;

a housing covering an upper side of said body and sealing said fixing member and said electromagnet therein, said housing having two electronic eyes fixed on an outer surface;

a power supplier fixed inside said housing and connected electrically with said electronic eyes, said supplier turned on and off by said electronic eyes and supplying power to said electromagnet;

a movable valve deposited in said chamber of said body, a leak chamber formed in an upper portion of said movable valve, a lengthwise center hole formed in said movable valve and connected with an outlet, a side hole formed beside said center hole and connected with said inlet, said movable valve moving up and down in said chamber by means of said electromagnet so as to divide the passageway between said inlet and outlet for opening and closing said flusher;

wherein said separating plate is provided with a center hole;

a lower valve base is fixed in said center hole of said separating plate and includes a valve recess in an upper surface and a first post extending down from a lower surface of the valve base, a lengthwise leak passageway formed in said valve recess and in said first post, a plurality of holes formed spaced apart around said first post, said first post extending in an upper section of said center hole of said movable valve;

an upper valve base fixed on an upper side of said lower valve base, an upper chamber formed between a lower surface of said upper valve base and said valve recess of said lower valve base, a second post extending down from a lower surface of said upper valve base, said second post partly extending in an upper section of said leak passageway of said lower valve base, said upper valve base and said second post having a lengthwise upper leak passageway, a plurality of upper leak holes formed spaced apart around said second post;

a film valve fixed in said upper chamber formed by said upper and said lower valve base and having a lengthwise post hole for said second post to pass through, an upper leak chamber formed between an upper surface of said film valve and a lower surface of said upper valve base, water pressure in said upper leak chamber controlling said film valve to disfigure and warp to block an upper opening of said leak passageway of said lower valve base, at least one lengthwise leak hole formed near said post hole of said film valve and communicating with said upper leak chamber and said leak hole of said lower valve base;

said fixing member formed with an upper passageway in the center of its bottom, said upper passageway normally blocked up by said core of said electromagnet, a plurality of lengthwise flow passageways formed spaced apart around said upper passageway and communicating with said upper passageway when said core is moved up;

wherein said movable valve works with said film valve to form a double valve structure of said flusher, whereby the different sizes of said leak chambers of said movable valve and said film valve lower a sealing force of said upper leak chamber so that said flusher can be used with low power and high water pressure so as to save electricity and flush out water of large volume and high speed for obtaining better cleaning effect.

2. The double valve flusher as claimed in claim 1, wherein said separating plate is provided with a position recess in an upper surface, a center hole formed in its center, and said lower valve base has a circumferential position edge of a comparative large diameter, said circumferential position edge fitting in said position recess of said separating plate, said upper valve base having a circumferential position edge of a comparatively large diameter formed in a lower portion to contact with said circumferential position edge of said lower valve base, with plural bolts screwing tightly together said upper valve base and said lower valve base and said separating plate.

3. The double valve flusher as claimed in claim 1, wherein said upper valve base has a valve recess formed in a lower surface, said valve recess of said upper valve base and said upper chamber of said lower valve base form an upper chamber, an annular stop projection is formed to extend down from the wall defining said valve recess of said upper valve base, said annular stop projection pushes said film valve in an annular position groove provided in said valve recess of said lower valve base so as to firmly keep said film valve between said upper and said lower valve base.

4. The double valve flusher as claimed in claim 1, wherein said fixing member has an annular position groove formed in a lower surface and facing said upper passageway so that said upper flow passageway is located in said annular position groove, and an anti-leak gasket is respectively is located at an inner and an outer side of said annular position groove to prevent water from leaking through the connecting surface of said upper and said lower valve base.

* * * * *